J. CALKINS.

Oil-Lamp.

No. 129,786.

Patented July 23, 1872.

Witnesses:
F. Heyer
A. B. Browne

Inventor:
James Calkins.
by Chas. E. Bishop.
Atty.

UNITED STATES PATENT OFFICE.

JAMES CALKINS, OF LONG BRANCH, NEW JERSEY.

IMPROVEMENT IN OIL-LAMPS.

Specification forming part of Letters Patent No. 129,786, dated July 23, 1872.

SPECIFICATION.

Specification describing certain Improvements in Lamps, invented by JAMES CALKINS, of Long Branch, in the county of Monmouth and State of New Jersey.

My invention relates to an improvement in oil-lamps by the introduction of a tube or cylinder extending from the top of the lamp to the bottom of its bowl, the tube having on the inside of its lower end a hollow conical frustum, the base of which passes beneath the surface of the oil; the object being to prevent explosion from gas generated in the bowl of the lamp.

Figure 1:
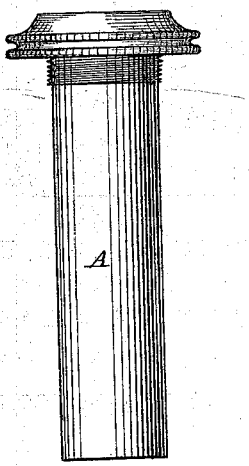
Figure 2:
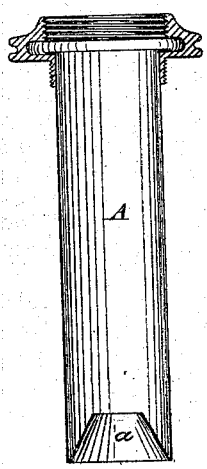

Figure 1 is a front view of a tube or cylinder embodying my invention. Fig. 2 is a sectional view of the same.

A represents a tube or cylinder embodying my invention, which is screwed into the top of the lamp, its lower end extending down to the bottom of the bowl, and the burner being screwed on as in ordinary lamps. a represents a hollow conical frustum in the bottom of the tube, about half an inch high, through which the oil passes readily to the wick, the lower end of which rests on this frustum and is thereby prevented from drawing up all the oil in the lamp. The tube passing beneath the surface of the oil is at all times air-tight, and therefore proof against any gas that may be generated in the bowl of the lamp surrounding the tube.

I claim as my invention—

The hollow conical frustum a in the lower end of the tube A, constructed in the manner stated, and for the purposes set forth.

JAMES CALKINS.

In presence of—
CHARLES R. LEE,
ADOLPH BUDWIG.